(12) United States Patent
Kerr

(10) Patent No.: US 10,346,581 B2
(45) Date of Patent: Jul. 9, 2019

(54) METHOD FOR SYSTEM LEVEL STATIC POWER VALIDATION

(71) Applicant: Toshiba Memory Corporation, Minato-ku, Tokyo (JP)

(72) Inventor: Benjamin Kerr, Northampton (GB)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/702,865

(22) Filed: Sep. 13, 2017

(65) Prior Publication Data

US 2018/0365367 A1 Dec. 20, 2018

Related U.S. Application Data

(60) Provisional application No. 62/520,236, filed on Jun. 15, 2017.

(51) Int. Cl.
 G06F 17/50 (2006.01)

(52) U.S. Cl.
 CPC ...... G06F 17/5081 (2013.01); G06F 17/5072 (2013.01); *G06F 2217/84* (2013.01)

(58) Field of Classification Search
 CPC ............. G06F 17/5022; G06F 17/5036; G06F 17/5045; G06F 17/5081; G06F 2217/78; G06F 2217/84
 USPC .................................................. 716/106, 133
 See application file for complete search history.

(56) References Cited

U.S. PATENT DOCUMENTS

| 7,376,847 | B2 | 5/2008 | Chen et al. |
| 7,551,985 | B1 | 6/2009 | Chen et al. |
| 8,365,132 | B2 | 1/2013 | Hsu et al. |
| 8,656,329 | B1 | 2/2014 | Kukal et al. |
| 8,949,102 | B2 | 2/2015 | Dai et al. |
| 9,679,097 | B2 | 6/2017 | Srivastava |
| 2007/0006103 | A1* | 1/2007 | Zhang ................. G06F 17/5045 716/112 |
| 2017/0228484 | A1* | 8/2017 | Ginsburg ............ G06F 17/5045 |

FOREIGN PATENT DOCUMENTS

CN 101071449 A 11/2007

OTHER PUBLICATIONS

Matt Elmore, "Understanding Power Integrity as a System-Wide Challenge," ANSYS, Apr. 20, 2012; 9 pages.

* cited by examiner

*Primary Examiner* — Paul Dinh
(74) *Attorney, Agent, or Firm* — White & Case LLP

(57) ABSTRACT

A method for validating the design of an electronic circuit uses a static checker tool to verify the circuit design against rules and attributes of the components of the circuit. A power intent of the circuit, pins for power, ground and data signal inputs and outputs for each component, and a model for attributes and parameters of the pins are defined. The attributes of the components are defined in terms of input and output voltages; input and output currents; input and output voltage, current and data signal timing; and input and output voltage and current ranges and tolerances. A netlist of interconnections representing the designed circuit is validated against the power intent and the model for the attributes. A report is output describing the validity of the circuit based on the compatibility of the netlist, the power intent, and the model for the attributes of the components.

20 Claims, 4 Drawing Sheets

METHOD FOR SYSTEM LEVEL STATIC POWER VALIDATION

CROSS REFERENCE TO RELATE APPLICATIONS

This application claims the benefit of priority from U.S. Provisional Patent Application No. 62/520,236, filed Jun. 15, 2017, the contents of which are incorporated herein by reference in their entirety.

FIELD OF THE INVENTION

The present invention generally relates to systems and methods for validation of an electronic circuit design with a power intent architecture.

BACKGROUND OF THE INVENTION

Design of any electronic circuit requires reconciliation of power supply and components to ensure that the device will function without mishap. Simulators currently exist which enable a computer-based simulation of the connectivity of an application-specific integrated circuit (ASIC) or system-on-chip (SoC). These simulators allow testing of the connectivity of pins within the circuit and check that the voltage provided to each pin is matched to the voltage requirement of the pin with a static checker tool. The simulator conducts a static verification of the power intent by simulating a power supplied through the elements of the circuit by a voltage transmitted from a power source.

Static low power checking is traditionally accomplished by defining a set of rules which are tested against a circuit design to determine if the design conforms to the rules. For power supply checking, this includes determining if a power supply of an ASIC is correctly connected to a particular pin.

The currently implemented simulator systems enable a user to place a plurality of pins and connections within an ASIC and to simulate the power through the ASIC. In some such simulators, a unified power format (UPF) file is created which formally describes the power intent of the system which is checked against the actual system implementation design by the static checking tool. The simulator models and verifies the system power distribution network prior to production of the system, and power supply errors can be quickly identified. The static checking tool confirms that the implementation of the ASIC matches the rules defined by the formal description of the power intent in the UPF file.

An ASIC includes millions of electrical connections which must be accounted for in the power testing system. For this reason, the systems which enable the simulation of ASICs or SOCs include the ability to check for a minimal number of features—expected and received voltage at a pin and connection type—in order to provide efficient testing of the connectivity of the circuit. Because of the number of connections which are checked by the static checking tool, it would not be feasible to extend the number of features without substantially increasing the computing time required for the static checker tool. Further, the complexity of individual components within a larger system such as a device or power supply system is much greater than individual logic gates in an ASIC. The current simulators are not able to be generalized to accommodate larger systems described by and including electronic circuits, such as solid state devices, printed circuit board (PCB) systems, power delivery networks, or even larger scaled complex electrical systems such as cars, because of the much greater complexity of the functionality of the voltages and signals on the pins and connections which would be needed to be described to test these systems in the current simulation software, which present UPF file formats are unable to provide.

Accordingly, there is need to correct the problems inherent to present day circuit simulation software systems.

BRIEF DESCRIPTION OF THE INVENTION

In an aspect, a method for validating the design of a system having a power intent architecture includes defining a power intent of an electronic circuit. The circuit includes a plurality of components which are interconnected with a plurality of power connections, ground connections, and data signal connections. The method includes defining for each of the plurality of components in the electronic circuit, a plurality of pins for power, ground, and data signal inputs and outputs. The method also includes defining, for each of the plurality of components, a model for attributes and parameters of each of the plurality of pins in terms of (i) input and output voltages, (ii) input and output currents, (iii) timing of input and output voltages, input and output currents, and data signals, and (iv) ranges and tolerances of input and output voltages and input and output currents. The method also includes, generating a representation of the electronic circuit as a netlist of interconnections, validating the netlist of interconnections against the power intent of the electronic circuit and the model for the attributes of each of the plurality of pins of each of the plurality of components. The method includes generating a report of the validity of the electronic circuit based on the compatibility of the netlist of interconnections, the power intent of the electronic circuit, and the model for the attributes of each of the plurality of pins of each of the plurality of components.

DETAILED DESCRIPTION OF THE INVENTION

Figure 1:
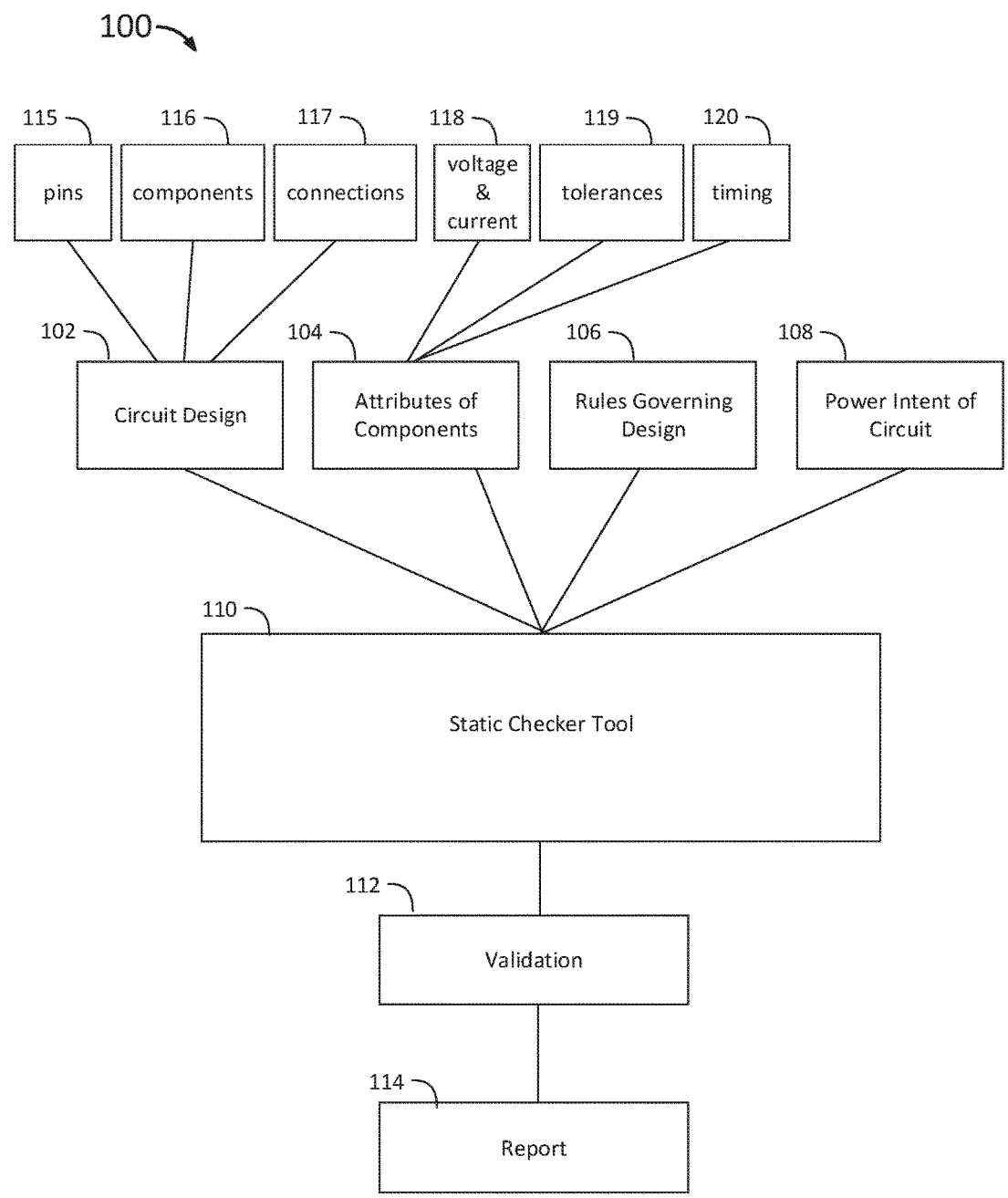
FIG. 1 is a block diagram illustrating the inputs and outputs of the static checker tool, according to an embodiment.

FIG. 1 is a block diagram 100 illustrating the inputs and outputs of the static checker tool 110 including as inputs one or more of input and output voltages; input and output currents; input and output voltage, current, and data signal timing; and input and output voltage and current ranges and tolerances. The static checker tool 110 includes as inputs a circuit design 102, attributes of circuit components 104, rules governing circuit design 106, and a power intent of the circuit 108. The circuit design 102 is based on the arrangement of pins 115, components 116, and connections 117 in the circuit. The attributes of components 104 can include any number of possible attributes. In particular, the attributes of components 104 include voltage and current 118, tolerances 119, and timing 120.

The static checker tool 110 uses the aforementioned inputs to assess the validity of the circuit design 102, taking into account the attributes of the components 104 and checking the attributes of the components 104 against the rules governing circuit design 106 and the power intent of the circuit 108. The static checker tool 110 performs the validation assessment 112 and provides as an output a report 114 regarding the validity of the circuit design 102.

The circuit design 102 checked by conventional static checker tools has traditionally been the design of ASIC circuits in which the components are limited to pins 115 and connections 116, of which there may be millions to check within an ASIC. Because of the large number of pins 115 and connections 116, processing power and time has been conserved by limiting the validation checks to the connectivity and voltage input and output to the pins 115 in the ASIC.

By generalizing the circuit to include not only chip-based circuits, but also larger systems such as SSDs, PCBs, or even larger electrical systems such as a car or other complex electrical systems, the components within the circuit become much more complex, and may require multiple power inputs which are not encountered in ASIC circuit design validation. A larger system requires more inputs and additional power supplies, all having different tolerances, requirements for sequencing, and power requirements. The challenges encountered in validating a larger system are significantly different than in validating a chip design. In order to validate the millions of connections present in a chip design, only a small number of checks are completed for each connection—typically a voltage matching check and a connection check. A large system such as an SSD or PCB includes significantly fewer elements than a chip, approximately one hundred for example, but in the larger system the features of interest are much more expansive than merely voltage matching and connectivity of the circuit. In order to accommodate the number of additional attributes which need to be validated in a larger system, the number of connections and components are reduced so that the validation can occur in a reasonable amount of time. In a large system made up of multiple chips on a board, the interaction between the components on the board is of interest, rather than the individual connections within the chip itself. The intricate details of the interactions between components in a large system, such as values, tolerances, and compatible timings and sequencing of voltages and currents, and voltage sequencing, are attributes which are not validated in traditional system checking tools.

The static checker tool 110 may be a traditional static checking software which simulates an electronic circuit. Alternatively, the static checker tool 110 may also be a newly created tool which relies on defined rules to check the validity of a simulated circuit. The static checker tool 110 is able to verify that the power connections and low-power structures implemented in a circuit are correct and match the original power intent. The static checker tool 110 does not perform dynamic simulation or formal checking on the input circuit design; it only validates the correctness of the design by checking it against a set of pre-defined rules. The enhancements which enable additional attributes of components 104 to be specified and which enable the extension to larger systems are accomplished by the addition of rules and specified characteristics in the computer readable syntax understood by the static checker tool 110.

For example, the traditional static checker tool uses a unified power format (UPF) file to describe the power intent of the system. The power intent describes control signals which control power domains. For example, the power intent includes a power state table indicating the voltages of the system during different phases of operation. The UPF captures the power supply intent of the circuit that needs to be checked. After the system has been implemented a "power-ground" (PG) Verilog netlist representation of the system may be generated, either manually or output from design tools such as schematic capture tools, PCB layout tools, or ASIC substrate design tools. Once the PG netlist is available, the static checker tool 110 checks the netlist describing the components of the system against the rules governing the circuit design 106. If the static checker tool 110 finds that a rule has been broken then an output report 114, for example a warning or error message, is generated indicating that the system has not been implemented as required.

The report 114 may be any indicator to a user of the validity or invalidity of the simulated circuit. The report 114 may be a pass/fail indication, a warning, a report, or an assertion regarding the validity of the system. The report 114 may specifically reference particular aspects of the circuit design 102 which violate the rules governing circuit design 106, or which have attributes of the components 104 which violate the rules governing circuit design 106.

Figure 2:
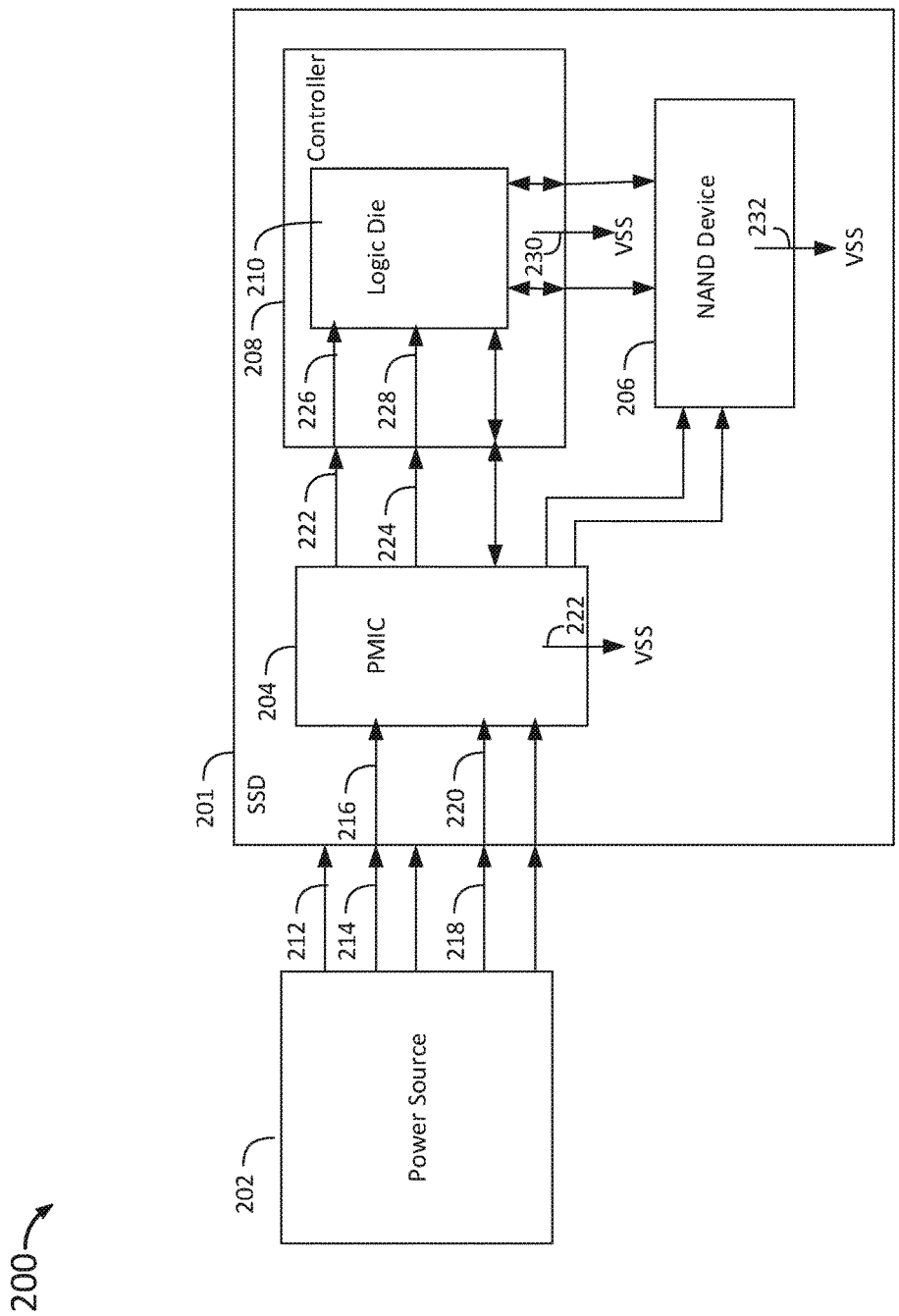
FIG. 2 is a block diagram of a Solid State Drive (SSD) system, including pins and connections for power transmission within the SSD, according to an embodiment.

FIG. 2 is a block diagram of a simplified example system, which is a Solid State Drive (SSD) system 200, including pins and connections for power transmission within an SSD 201 and connecting the SSD 201 to a power source 202. The SSD system 200 includes an SSD 201 and a power source 202. The SSD 201 includes a power management integrated circuit (PMIC) 204, a NAND device 206, and a controller 208 including a logic die 210. The power source 202 provides power to the SSD 200 via connection 212 at 12 V, and provides 5 V at connection 214. The 5V are further distributed to the PMIC by connection 216. The power source 202 connects to SSD 200 by ground connection 218 and further to the PMIC 204 by ground connection 220.

The PMIC 204 connects to the controller 208 at connection 222 and at connection 224. The pins at the controller 208 at the ends of connection 222 and 224 also connect to the logic die 210 by connection 226 and 228, respectively. The controller 208 and the logic die 210, as well as the PMIC 204 connect to the NAND device 206. Additionally, the PMIC includes a ground pin connected to a VSS pin by connection 222, the controller includes a ground pin connected to a VSS pin by connection 230, and the NAND includes a ground pin connected to a VSS pin by connection 232.

So that the SSD system 200 works correctly, a static checker tool 110 may be implemented to validate the power intent of the SSD system 200. The static checker tool 110 validates the electrical connections between pins on the components of the SSD 201 and between the SSD 201 and the power source 202 according to rules governing the design of the circuit. Conventionally, the static checker tool checks the SSD system 200 and determines whether all voltages are correctly matched across the system. For example, the conventional static checker tool verifies that 5 V of power are provided at connection 214 from the power source 202 to the SSD 201, and that the PMIC 204 is capable of receiving 5 V over connection 216. If, for example, 12 V were supplied to the SSD 201 on connection 214, but the pin at the end of connection 214 is only equipped to receive 5 V, the traditional static checker tool would issue a warning that the SSD system 200 was not properly implemented.

While the traditional static checker tool is able to validate certain aspects of an electronic circuit, in particular voltage matches and connections between pins, the conventional static checker tool lacks the nuances or information to validate other important aspects of a circuit. Voltage matching and connections may be sufficient for design validation of a chip, but for larger systems additional characteristics of the circuit need to also be validated. By extending the attributes which can describe connections and pins in a circuit, and the rules by which the circuit is validated, the static checker tool 110 is enhanced to enable it to validate larger systems featuring more diverse components.

In current systems, which are used for design and testing of ASICs, the internal components of the ASIC are generally compatible, being logic cells implemented in the same silicon technology. However, in building various electronic circuits, and in particular larger devices, there are a multitude of complex individual components necessitating additional parameters which must be known and tested. The components of a larger device may be more varied and individually may contain multiple different technologies that have different operating parameters. The inclusion of additional attributes which can be tested by a static checker tool 110 allow the design of a larger system incorporating many diverse components to be checked in ways that are not possible within an ASIC or single chip system.

Additional attributes which can be used to describe components, pins, or connections in the circuit include input and output voltages; input and output currents; input and output voltage, current, and data signal timing; and input and output voltage and current ranges and tolerances. The attributes of current input and output, tolerances, and timing greatly expand the features that can be validated by the static checker tool 110 and the static checker tool 110 can be used to validate larger and more complex systems. The attributes may further be defined to include power state tables describing sequencing, variable voltage power states, I/O standards, type or class of a pin or connection, supply tolerance, voltage tolerance, power and ground pin (PG pin) current capability, I-V curves, differential pairs, maximum skew on a bus, analog impedance checking, ESD protection, static latch-up checking, PG pin quiet or filtered, ground, and electrically isolated or high voltage pins described below. Other attributes can also be defined and may be desirable; the component characteristics detailed below represent a sampling of what is possible.

Typically, an industry standard library format such as Liberty™ describes the characteristics of components in .LIB files. A UPF file formally defines the power intent of the system. UPF and .LIB formats can both be enhanced to accommodate additional attributes and rules. UPF has the ability to specify the power requirements or current requirements of a particular pin. As described above, in an electronic component there may be multiple PG pins, and the static checker tool 110 determines whether the components within the circuit are connected correctly. Defining new attributes such as those below to be applied to a PG pin enhance the static power checking of the validation system.

The components can be defined to include input and output currents. For example the current requirements of a pin can be declared and checked by the static checker tool 110 as part of the validation of the system. If the power supply 202 provides 500 mA of current over connection 214, and the pin at the end of connection 214 consumes 500 mA of current, the rule is satisfied and the static checker tool 110 determines that the connection is valid. If, however, the pin at the end of connection 214 consumes 700 mA of current, the static checker tool 110 determines that there is a current mismatch and that the circuit is not correctly implemented. The static checker tool 110 then issues a warning or a report indicating that the connection 214 breaks a rule of the circuit. In some instances, the component may be correctly connected to a power supply, but the current being provided may be incorrect.

In addition to the additional attributes that describe components of the system, the power intent definition can also be updated to take into account the component attributes. The power intent can be defined to include a power state table which describes a power sequencing rather than only static power states. The power state table can be used as a control input by the static checker tool 110 during the validation of the system. When the power state table describes power sequencing, during validation of the system the power state table ramp up and ramp down time are considered. The static checker tool 110 determines based on the defined component attributes, that the power state table defined ramps are correctly implemented in PG pins, and that the sequencing of the power is also correct throughout the electronic circuit. The power state table can be further updated to include not only sequencing and timing information, but also voltage and current ranges and tolerances. This increases the ability of the static checker tool 110 to effectively validate the system for multiple possible power states that may be encountered. Further, the static checker tool 110 determines whether a first voltage rail must be present in the electronic circuit and stable for some period of time before a second voltage rail is applied, for example. The sequencing of the power throughout the electronic circuit and the ramp times enable the static checker tool to provide additional useful validation of components in a large scale system. For example, a rule may be created that voltage must be present at connection 214 for a period of time before connection 216. If connection 216 is improperly connected, and there is a voltage on connection 216 before connection 214, the static checker tool 110 determines that the rule of the voltage sequence is broken and issues a warning.

The components can be further defined to include an attribute of variable voltage power states which describes the voltage range of a power supply, rather than only a point value. By defining such a component attribute, the static checker tool 110 sweep checks the voltages from a minimum supply to a maximum supply to enable dynamic voltage and frequency scaling within the electronic circuit. The static checker tool 110 identifies cross-overs within the circuit during the voltage sweeps to validate the circuit.

The components can be defined to include a multitude of known standard Input/Output (I/O) attributes for a particular component, for example the LVCMOS18 I/O standard. By defining a class of components having known standard attributes such as input and output voltages; input and output currents; input and output voltage, current, and data signal timing; and input and output voltage and current ranges and tolerances included in the class definition, a user is quickly able to define components in a system, and the static checker tool 110 quickly validates the design of the circuit including the defined component. The static checker tool 110 also checks for the presence of a compatible I/O standard at the driver and the receiver during validation, and outputs a report if there is an I/O standard mismatch. Other I/O types which may be specified include, but are not limited to SSTL, LVDS, PECL, and CML.

The addition of standard I/O attributes, or other attributes, to components of an electrical system enable the class of objects to be further specified. This may be useful in enabling more fine-tuned searching of objects within a specified electrical system. The expansion of an existing ability to find objects within the electronic circuit allows the static checker tool 110 to traverse the circuit design to search and locate components with a greater precision. For example, by including a standard attribute to specify the I/O connections within the chip according to their type and placement, as internal or external for example, a user can more easily and efficiently search and/or filter results to identify a component of interest. For example, one I/O connection includes an attribute defining it as an I/O connection pad, while another I/O connection includes an attribute defining it as a core I/O connection. By incorporating additional attributes which provide a definition of the type and placement of the I/O connection within the electronic circuit, searching for these components within a circuit can be greatly improved. For example, it allows an additional measure of granularity or filtration with which to search for types of I/O connections within the circuit. This is particularly useful in large scale devices in which there may be hundreds of I/O connections which are searchable.

Additional objects and components within a device can also be searched for based on this enhanced component attribute and find object syntax. Other elements beyond I/O connections or paths can also have additional attributes applied to them which help with the filtering of the list of found objects from a query. For example, logic gates within an entire PCB or power supply can benefit from additional attributes which help to define the gates in a search. The list of attributes definable for components can be extended to enable the location of arbitrary types of objects as well as objects and components currently defined.

The components can include an attribute of a voltage supply tolerance, for example as defined for a PG pin. The specification of the voltage supply tolerance can then be used in conjunction with the power state and power state table to determine if the voltages provided to the PG pin are within the tolerance. The power state table can also be expanded to include voltage tolerances available within the system. This provides a more accurate model of the electronic circuit and enables a more complete validation of the system.

The components can include an attribute of a PG pin current capability in which the maximum input and/or output current of a PG pin is specified. During validation of the circuit the static checker tool 110 sums the input current across the PG pins and checks against a maximum current output by an output pin to check for an overload of the power supply. The inclusion of a current attribute, as well as voltage, further allows static checker tool 110 to additionally make calculations and determinations regarding the power of the system.

The components can include an attribute which captures the current and voltage (I-V) curves in the pin description. The inclusion of I-V curves in the attributes for a PG pins and/or signal pins increases the accuracy of the electronic circuit model. The static checker tool 110 uses the I-V curves to verify that the signals exchanged between signal pins are correctly implemented, as the signals have certain characteristics which define a particular pin and the current that the pin can provide and/or receive. Because the I-V curve describes the characteristics of the signal connection, the static checker tool 110 determines if there is an incompatibility between the I-V curves and the signal pins by comparing the I-V curves for two signal pins to determine if the two curves are compatible. For example, in some cases a first I-V curve describing a strong signal with a large amount of current capability connects to a pin that is easily damaged by too much current flowing to the pin and the static checker tool 110 determines that there is an incompatibility in the system. The addition of I-V curve attributes to the electronic circuit extends the static checker tool 110 beyond PG checking into checking of connections and signaling.

The components can include an attribute assigned to differential pairs of I/O connections. Because the signal between a differential pair of I/O connections precisely matches in terms of length and signal, differential pairs can have a defined attribute marking them as a differential pair in the circuit design so that they are treated as a differential pair during design and validation. The connection is described by the differential pair attribute and the static checker tool 110 ensures that the differential pair is maintained and that the pairing has not been split up or interfered with during the circuit design.

The components can include an attribute of a maximum skew on a bus in which the system designates signals carrying similar data between chips as a bundle. The static checker tool 110 determines if the bundle of signals has been interfered with, and may also determine if the delays on each bus are similar within the bundle.

The components can include an attribute of a specified analog impedance checking by defining an attribute of impedance requirements for analog or digital for pins within an electronic circuit. An analog signal includes a time-variant component. By defining the analog impedance of the components and connections within the electrical system, the static checker tool validates whether the impedance characteristics are met by the system design. The additional analog impedance attribute along with the extension of the voltage checking can also enable the static checker tool 110 to validate the current supplied to the pins against the analog impedance of the pins, as well as check that analog pins are not connected to digital pins.

The components can include an attribute of an electrostatic discharge (ESD) protection to enable the static checker tool to determine if the circuit has sufficient ESD protection. ESD protection level defines the amount of voltage that the system can withstand. Adding the attribute of ESD protection for each pin enables the static checker tool 110 to determine if the system has sufficient ESD protection. For example, if a system is required to withstand 1 kV of ESD, this can be specified as a rule across the system in the power intent definition or as a control considered during validation. According to the rule, all components of the system must include at least 2 kV of ESD protection. The static checker tool 110 compares the rule to the components of the system, and because the ESD attribute is included, can report that a certain pin has only 1 kV protection.

The components can similarly include a definition of a latch-up attribute that can be applied to pins to enable static checking of immunity to latch-up (latch-up being a condition where some trigger event such as a current spike or over-voltage impulse causes a low-impedance path between a voltage supply pin and ground which persists after the trigger is removed). This enables an additional reliability check to be made on the electronic circuit system.

The components can include a definition of a quiet or filtered supply for pins. The attribute can be applied to "quiet" pins which require a dedicated low-pass filter (for example, phase lock loop (PLL) supply pins). The addition of the quiet attribute enables the static checker tool to determine during validation of the system that quiet pins do not connect to noisy supplies and that low-pass filers are appropriately implemented on a supply pin. The static checker tool 110 also determines the frequency response of the low-pass filter with regard to the quiet pin attributes.

Further, the definition of a quiet supply attribute enables the supply to be successfully searched for within a PCB implementation in order to ensure that the circuit design includes required circuitry. The static checker tool 110 makes determinations about the attributes and whether pins with a particular attribute are connected to pins having the same or different attributes.

The components can include an attribute as to whether a pin is a ground pin requiring a VSS connection. By declaring that certain pins are ground pins which need a galvanic (star) connection, the static checker tool 110 validates the system according to the rule that ground pins must be connected by a galvanic or VSS connection, and provides a warning if a ground pin is not appropriately implemented in the circuit. The static checker tool 110 also determines if all galvanic connections are common without immediate wiring, in accordance with galvanic connection rules. For example, the SSD system 200 correctly indicates ground pins 222, 230, and 232 as connected to a VSS connection, but if one of the three connections were to be connected to a different wire, the static checker tool 110 would determine that the ground pin breaks the rule and would issue a warning that the circuit was not correctly implemented according to the set rules and attributes of the components.

Some components of the circuit can be described by an electrical isolation attribute. Electrical isolation can be a critical safety consideration in the circuit, and high-voltage pins or nets have a greater clearance requirement to other connections. The attribute may be implemented as a declaration of voltage and/or a spacing rule for the pins and nets. The static checker tool 110 uses rules regarding high voltage clearance to validate the designed circuit and to flag pins and connections in the simulated circuit that violate the rule to determine if there is a safety concern/implication. The static checker tool 110 performs checks for appropriate electrical isolation between high voltage pins and nets, or, if a signal requires electrical isolation with no physical wire between two places, the static checker tool 110 determines if an appropriate transformer or optical coupler connect to the high voltage pin.

In some implementations, the component attributes described above are further incorporated into the static checker tool 110 in order to specify layout constraints for electrical systems. The static checker tool 110 simultaneously provides the layout constraints according to the rules regarding component attributes and connections, while providing live checking of power supply connectivity as the layout is implemented.

The component attributes described above are not present in traditional static checker tools which are designed for validation of ASIC design only. These component attributes extend the functionality of the static checker tool 110 to larger designs which include multiple "black box" components far more complex than components generally found in an ASIC. Although the components of a PCB, SSD, or larger system are more complex than the components typically found in an ASIC, the number of components in a large system is also much smaller than the number of components in an ASIC. This allows the number of connections which must be validated to be decreased even while the number of different attributes and parameters which can and should be validated within the circuit increases. It is desirable to understand the more diverse aspects of the connections between components on a larger system, as these components often come from different technological areas and are not necessarily designed for use with each other.

The extension of the standard file format used in conventional static checker tools enables the definition of the power intent and the validation of the power intent for the system including additional component attributes, parameters, and rules guiding the positioning and use of the attributes within the circuit. By extending the conventional static checker tool to include enhanced constructs such as currents, tolerances, timings, variations in power supply, and other component attributes, the static checker tool 110 can be extended from validation of a chip to any electrical system of an arbitrary size. The additional attributes and coordinating rules extends the scope of static power verification techniques beyond the traditional use during ASIC design. The static checker tool 110 continues to apply the concept of static low power checking by testing a design against a set of rules, but the ability of the static checker tool 110 expands to accommodate a wide variety of electrical systems and potential components having various attributes. The UPF syntax, or any other standard language syntax, could be extended to add even more constructs specific to system level power integrity analysis.

Figure 3:
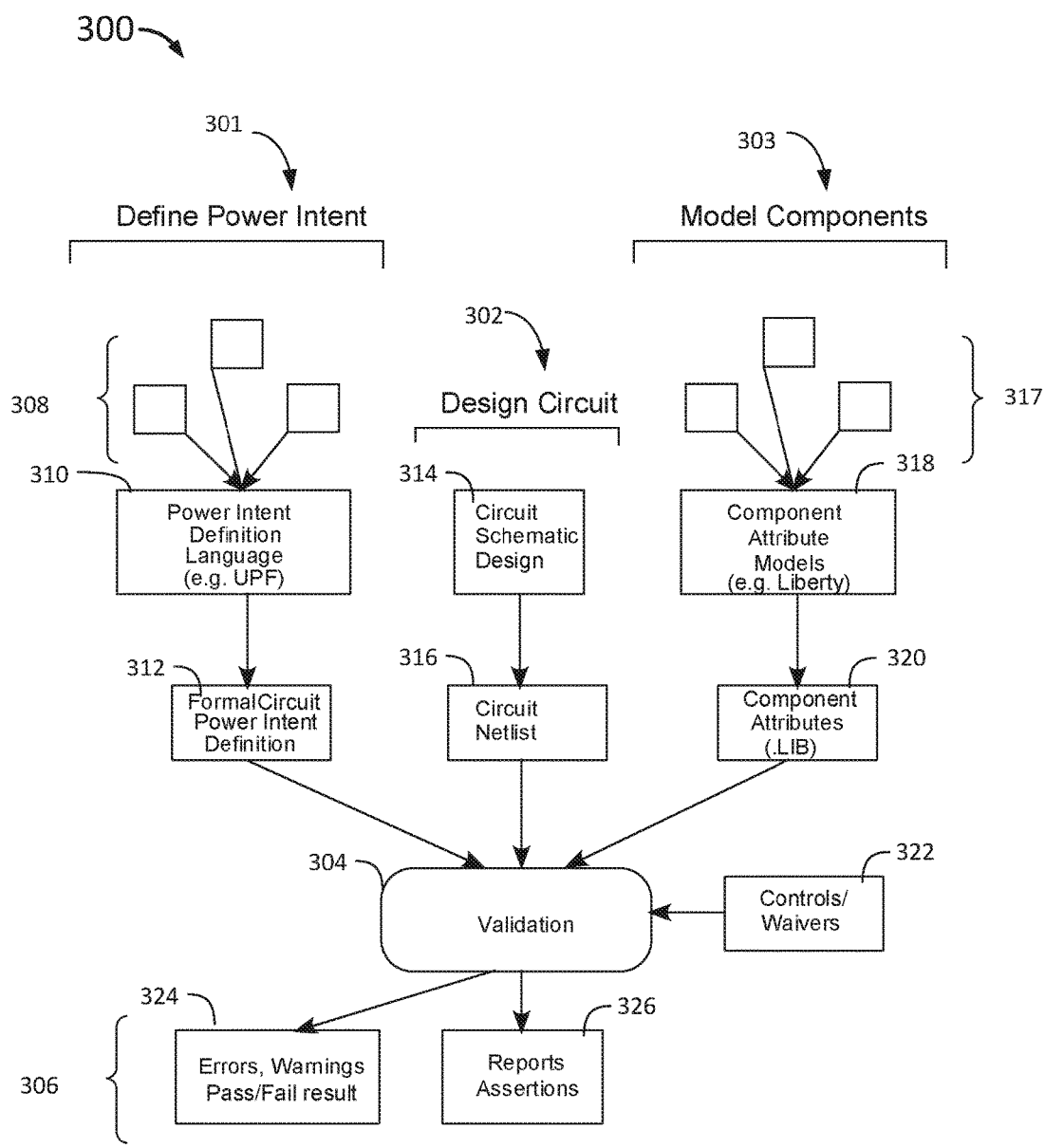
FIG. 3 is a flow chart of the process of checking attributes of an electronic circuit, according to an embodiment.

FIG. 3 is a flow chart of the process of checking attributes of an electronic circuit, including input and output voltages; input and output currents; input and output voltage, current and data signal timing; and input and output voltage and current ranges and tolerances. The static checker tool 110 performs routines in parallel: (1) defining power intent 301, (2) designing the circuit 302, and (3) modelling the components 303. These three processes complete before validation 304 of the electronic circuit can occur.

The first step in defining power intent 301 begins by introducing new constructs 308 to define a power intent for a system. The new constructs include, for example, information about the correct implementation of input and output voltages; input and output currents; input and output voltage, current, and data signal timing; and input and output voltage and current ranges and tolerances within the system. The additional information integrated into the power intent definition allows for the static checker tool 110 to make more nuanced determinations about the correct implementation of systems larger than a simple chip-based system.

The system power intent is defined according to a standardized language 310, for example, UPF. UPF traditionally is used to define the power system of an ASIC, but is here extended to include any component in a general power system or circuit. The UPF language provides a definition of the power requirements of the system to front-end and back-end implementation tools, and can be used by the tools to create rules to check against an implementation netlist representing the system in its entirety.

The system power intent described in the standardized language shown in 310 is then read by a simulator system using a static checker tool 110 to define a formal circuit power intent definition 312 as a system of rules to which the electronic circuit adheres. The static checker tool 110 uses the rules of the formal circuit power intent definition 312 to verify proper implementation of the power intent within the circuit.

The second process, designing the circuit 302, begins with design of the circuit schematic 314 in which the desired implementation of the electronic circuit is described. The circuit schematic includes components of the circuit, as well as connections between the components providing pathways for current, voltage, signals, and data to be transmitted between the components. For example, the circuit schematic for an ASIC may include a plurality of pins connected by a plurality of connections to each other and grounds, as well as a power input. In contrast, as described above with regard to FIG. 2, a circuit schematic describing an SSD includes a memory, a memory controller, a RAM, a power supply, a voltage, and an interface coupled to each other by various connections.

This circuit design uses proprietary schematic design and capture tools to implement the electronic circuit, including all components, as well as connections between PG pins across the circuit. The circuit schematic describes the components and connections between components, as well as the connections of components to the power supply. This schematic is then converted to a standard circuit netlist which describes the connections between the components.

Traditionally, the static checker tool describes a netlist that models the power implementations. After the system has been implemented, a netlist representation of the system is generated. For example, the netlist may be a "power-ground" (PG) Verilog netlist which includes module port connections for power supply ports. This might be generated manually, or it could be output from design tools such as schematic capture tools, PCB layout tools or ASIC substrate design tools.

The third process, modelling the components 303, begins with defining the abstract models of system level components 317 having various attributes. The components 317 include attributes not only related to the connectivity of the pins and voltage requirements, but also input and output voltages; input and output currents; input and output voltage, current and data signal timing; and input and output voltage and current ranges and tolerances. The addition of these attributes to the components 317 allows the checking software to be expanded to include larger and more complex systems with more diverse components than ASICs. For example, additional component attributes enable the static checker tool 110 to efficiently validate electronic system components such as chip connections, power regulators on a PCB, power connector to a power supply, or any other component.

The component attributes and parameters are defined in a standard format, such as the industry standard Liberty™ format. Liberty™ format is principally used to describe library circuit cells in an integrated circuit, but has been extended here to include any power system component with new attributes and parameters. The attributes which are used to describe the components 317 can also include additional attributes such as input and output voltages; input and output currents; input and output voltage, current, and data signal timing; and input and output voltage and current ranges and tolerances.

The component attributes can be translated by the static checker tool 110 into a secondary language, for example industry standard Liberty™ format (.LIB) files, which provides a model to allow the abstract behaviours of the system components to be specified. In particular, as described above, this is important for "black box" components which may be included in larger devices and systems. The secondary language into which the component attribute definitions are translated provide these attributes into a syntax readable by the static checker tool 110 as it checks each component 317, connection, and component attribute in the circuit netlist 316 in view of the formally defined circuit power intent rules 312.

Once each of the three processes of defining power intent 301, designing the circuit 302, and modelling the components 303 have been completed, the static checker tool 110 can be implemented for validation 304 of the electronic circuit. The static checker tool 110 uses the formal circuit power intent definition rules 312 to check against the circuit netlist 316 which provides the connectivity of the schematic circuit design 314 and against the component attributes 320 which define the attributes of each of the connected components. The static checker tool 110 is used to confirm that the system has been implemented as described in the original UPF power intent definition 312. The static checker tool 110 checks the PG netlist and component attributes against the UPF rules.

The validation 304 takes into account additional controls and waivers 322. Waivers can be defined to exclude certain errors from the final reports 306 provided by the static checker tool 110.

After the system has been validated 304, the method provides indications of compatibility or incompatibility 306 between the model of the component attributes 320, the power intent definition 312, and the circuit netlist 316 in terms of voltage and current inputs and outputs, tolerances or ranges, and timings or scheduling of the voltage and current inputs and outputs. If the tool finds that a rule has been violated, an error message is generated indicating that the system has not been implemented as required. For example, the static checker tool 110 may provide an error message, a warning that an incompatibility has been identified, or a pass/fail report for the system 324. Additionally, in some implementations, the static checker tool 110, based on the power intent, component attributes, and circuit netlist, provides a report of potential incompatibilities and warnings that can be used to refine the circuit design.

In some implementations, the static checker tool 110 provides a list of assertions 326 based on the formal circuit power intent definition 312, the circuit netlist 316, and the component attributes 320 which can then be used in other simulation systems, such as dynamic electronic circuit simulators. The static checker tool 110 extracts additional rules about the function of the circuit from the validation as an assertion of something that should always or should never happen within the circuit according to the circuit design, rules governing the circuit, the power intent of the circuit, and the attributes of the circuit components. For example, a static checker tool 110 provides an assertion 326 that voltage must be present at PG pin 1 before voltage is received at PG pin 2. When such an assertion 326 is then used in a dynamic simulation, the rules can be further validated against the circuit design. The warnings 324, reports, and assertions 326 provided by the static checker tool 110 after validation provide useful feedback regarding the design of the electronic system incorporating the additional component attributes of input and output voltages; input and output currents; input and output voltage, current, and data signal timing; and input and output voltage and current ranges and tolerances.

The addition of component attributes of input and output voltages; input and output currents; input and output voltage, current, and data signal timing; and input and output voltage and current ranges and tolerances increases the usefulness of the simulation system to include larger scale circuits such as a solid state device, PCB system, power delivery network, or even larger scaled device which require more complex validation beyond voltage and connectivity. The static checker tool 110 is enhanced by the additional component attributes to allow checking for power intent on systems such as an entire PCB or a device in which an ASIC is installed. The static checker tool 110 is enhanced to include validation of systems that include additional circuitry beyond that present in an ASIC, such as the power supply of a host computer.

Figure 4:
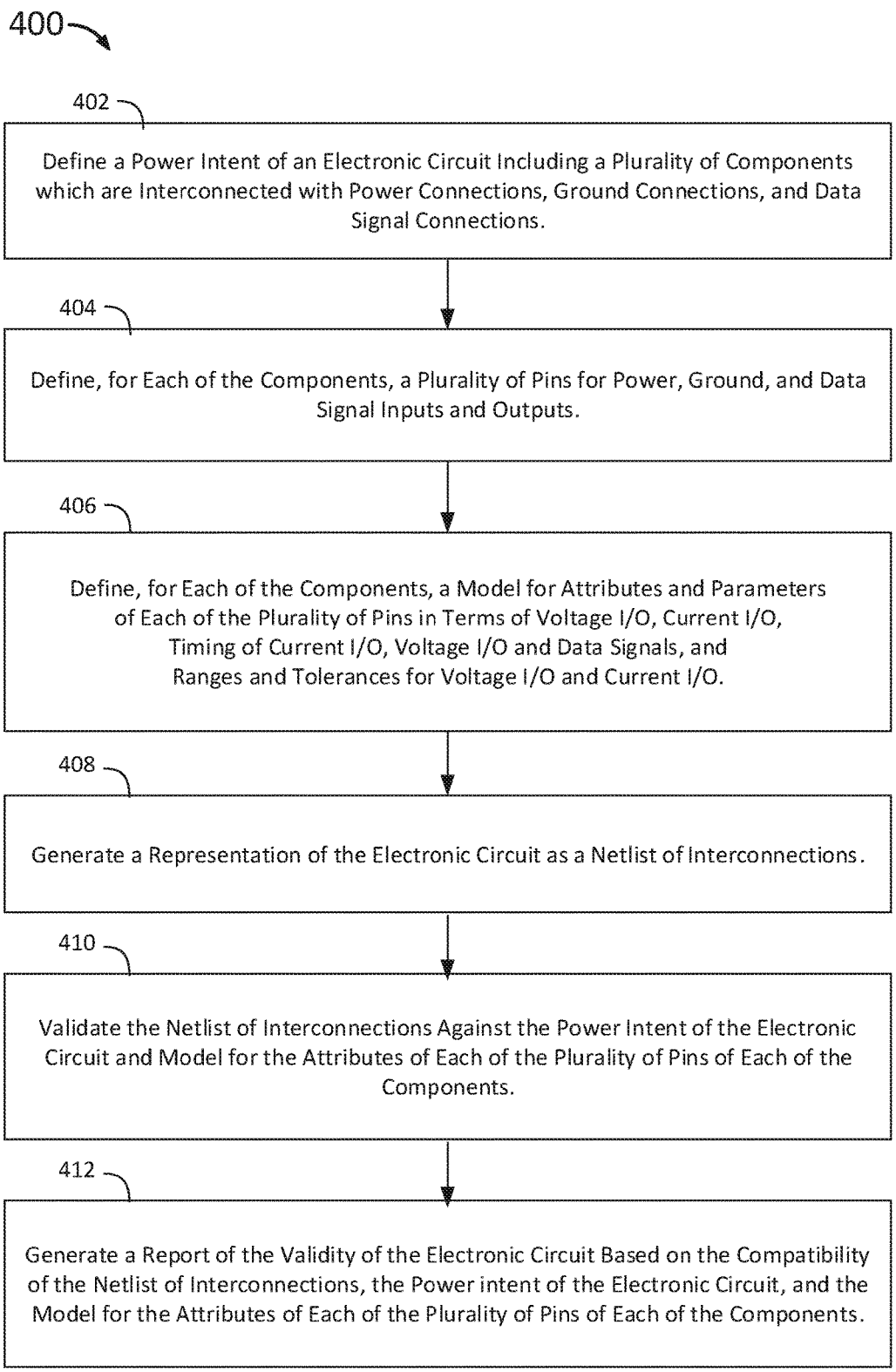
FIG. 4 is a flow chart of a process of validating the design of an electronic circuit system of indiscriminate size having a power intent architecture, according to an embodiment.

FIG. 4 is a flow chart 400 that illustrates a process of validating the design of an electronic circuit system of indiscriminate size having a power intent architecture. The process begins with step 402, at which a power intent of an electronic circuit is defined. The electronic circuit includes a plurality of components, for example ASICs, RAM, voltage regulators, capacitors, memory chips, memory controllers, power supplies, or any other appropriate component of a large electronic system. The components of the electronic circuit are interconnected by power, ground, and data signal connections.

At step 404, for each of the components in the electronic circuit a plurality of pins for power, ground, and data signal input and outputs are defined. At step 406, for each of the components in the electronic circuit a model for the attributes and parameters associated with each of the pins in the plurality of pins is defined. The attributes defined for the pins include input and output voltages; input and output currents; the timing data for input and output current, voltage, and data signals; and ranges and tolerances associated with the input and output voltage and current. Additional attributes may also be defined, for example power state tables describing sequencing, variable voltage power states, I/O standards, type or class of a pin or connection, supply tolerance, voltage tolerance, PG pin current capability, I-V curves, differential pairs, maximum skew on a bus, analog impedance checking, ESD protection, static latch-up checking, PG pin quiet or filtered, galvanic ground, and electrically isolated or high voltage pins.

At step 408, a representation of the electronic circuit is generated as a netlist of interconnections. At step 410 the netlist of interconnections is validated against the power intent of the electronic circuit and the model for the attributed of each of the plurality of pins of each of the components in the electronic circuit. During this step the netlist, power intent, and model are compared to each other to ensure that the netlist, power intent, and model are compatible and have been correctly implemented in the electronic circuit.

At step 412, a report is generated regarding the validity of the electronic circuit based on the compatibility of the netlist of interconnections, the power intent of the electronic circuit, and the model for the attributes of each of the plurality of pins of each of the components. The report can be a simple pass/fail or warning, or the report can be a more detailed report including specific indications of which components and interconnections cause the electronic circuit to be invalid.

The extension of the static checker tool 110 to include attributes useful in the validation of larger scale systems including complex interconnected components enables electronic circuit validation systems to be useful in validation of larger scale systems, without requiring massive computing power. The intricate and detailed checking of large scale systems which can be completed with the addition of new attributes in computer understandable formats allows the validation system to be more generally applied to multiple scaled systems for efficient and practical validation of such systems.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A method for validating a design of a system having a power intent architecture, the method comprising:
    storing, in a memory associated with a simulator system:
        power intent parameters of an electronic circuit comprising a plurality of components which are interconnected with a plurality of power connections, ground connections and data signal connections,
        pin parameters associating a plurality of pins with power, ground, and data signal inputs and outputs (I/O) functionality, and
        a model for attributes and parameters of each of the plurality of pins in terms of:
            (i) voltage I/O,
            (ii) current I/O,
            (iii) timing of voltage I/O, current I/O, and data signals, and
            (iv) ranges and tolerances of voltage I/O and current I/O;
    generating, using the simulator system, a representation of the electronic circuit as a netlist of interconnections;
    validating, using the simulator system, the netlist of interconnections against the power intent parameters and the model for the attributes and parameters of each of the plurality of pins; and
    in response to generation of the netlist and validation of the netlist, outputting from the simulator system a report of a validity of the electronic circuit based on a compatibility of the netlist of interconnections, the power intent of the electronic circuit, and the model for the attributes of each of the plurality of pins of each of the plurality of components, for subsequent design or manufacture of the system.

2. The method of claim 1, wherein the electronic circuit includes as components at least a memory controller and a memory.

3. The method of claim 1, wherein the power intent includes a power state table defining voltage and current sequencing and timing and voltage and current ranges and tolerances.

4. The method of claim 1, wherein the model for attributes and parameters includes a variable voltage power supply to a pin of the electronic circuit.

5. The method of claim 1, wherein the model for attributes and parameters includes, for a pin in the plurality of pins, a voltage tolerance for the pin, and wherein validating the netlist includes determining if a voltage supplied to the pin is within the voltage tolerance.

6. The method of claim 1, wherein the model for attributes and parameters includes a rule that a voltage must be present at a first pin for a period of time before a voltage is present at a second pin.

7. The method of claim 1, wherein the model for attributes and parameters includes an electrostatic discharge protection of each of the plurality of pins, and wherein validating the netlist includes determining if the electrostatic discharge protection of each of the plurality of pins satisfies a required electrostatic discharge protection of the electronic circuit.

8. The method of claim 1, wherein the model for attributes and parameters includes describing a first pin described by a maximum input current and identifying a second pin described by a maximum output current, and wherein validating the netlist includes comparing the maximum input current of the first pin and maximum output current of the second pin to identify whether there is sufficient output current from the second pin to drive the input current of the first pin.

9. The method of claim 1, wherein the model for attributes and parameters includes describing a first pin with a first current-voltage curve and defining a second pin connected to the first pin with a second current-voltage curve, and wherein validating the netlist includes comparing the first current-voltage curve with the second current-voltage curve.

10. The method of claim 1, wherein the model for attributes and parameters includes describing a first pin and a second pin of the plurality of pins as a differential pair pin and wherein validating the netlist includes determining if the differential pair of pins satisfy a set of rules governing differential pairs in the electronic circuit.

11. The method of claim 1, wherein the model for attributes and parameters includes describing a standard I/O class of a component.

12. The method of claim 1, wherein the model for model for attributes and parameters includes an I/O standard applicable to a first pin, and wherein validating the netlist includes determining whether a second pin connected to the first pin is also described by the I/O standard.

13. The method of claim 1, wherein the model for attributes and parameters includes describing an analog impedance of an analog pin, and wherein validating the netlist includes checking that the current flow to the analog pin overcomes the analog impedance.

14. The method of claim 1, wherein the model for attributes and parameters includes describing a pin as quiet supply pin, and wherein validating the netlist includes checking to ensure that a power supply connected to the quiet supply pin is not noisy, and checking that a low-pass filter is connected to the quiet supply pin.

15. The method of claim 1, wherein the model for attributes and parameters includes describing a pin as a ground pin, and wherein validating the netlist includes determining that a connection to the ground pin is a galvanic connection.

16. The method of claim 1, wherein the model for attributes and parameters includes describing a pin as a high-voltage pin, and wherein validating the netlist includes determining that the high-voltage pin is electrically isolated.

17. The method of claim 16, wherein the high-voltage pin has an associated attribute of a required distance from a next pin, and wherein validating the netlist further includes determining if the next pin is at least the required distance from the high-voltage pin.

18. The method of claim 16, wherein validating the netlist further includes determining if an opto-coupler or transformer is connected to the high-voltage pin.

19. The method of claim 1, wherein outputting the report further comprises identifying at least one of the plurality of pins of each of the plurality of components which violates the netlist of interconnections or the power intent of the electronic circuit, and outputting the list of the at least one plurality of pins of each of the plurality of components identified as an invalid pin.

20. The method of claim 1, wherein outputting the report further comprises determining an assertion true of the electronic circuit.

* * * * *